US006905992B2

(12) United States Patent
Mehrotra et al.

(10) Patent No.: US 6,905,992 B2
(45) Date of Patent: Jun. 14, 2005

(54) CERAMIC BODY REINFORCED WITH COARSE SILICON CARBIDE WHISKERS AND METHOD FOR MAKING THE SAME

(75) Inventors: Pankaj K. Mehrotra, Greensburg, PA (US); Shanghua Wu, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/208,597

(22) Filed: Jul. 30, 2002

(65) Prior Publication Data

US 2004/0023788 A1 Feb. 5, 2004

(51) Int. Cl.$^7$ .............................................. C04B 35/00
(52) U.S. Cl. .............................. 501/87; 501/88; 501/89; 501/92; 501/94; 501/95.1; 501/95.2; 501/96.1
(58) Field of Search .............................. 501/87, 88, 92, 501/94, 95.1, 95.2, 96.1, 95; 51/307, 309

(56) References Cited

U.S. PATENT DOCUMENTS

| | | | |
|---|---|---|---|
| 4,463,058 A | 7/1984 | Hood et al. | 75/229 |
| 4,507,224 A | 3/1985 | Toibana et al. | 252/516 |
| 4,543,345 A | 9/1985 | Wei | 501/95 |
| 4,652,413 A | 3/1987 | Tiegs | 264/66 |
| 4,789,277 A | 12/1988 | Rhodes et al. | 409/131 |
| RE32,843 E | 1/1989 | Wei | 501/95 |
| 4,801,510 A | 1/1989 | Mehrotra et al. | 428/698 |
| 4,867,761 A | 9/1989 | Brandt et al. | 51/309 |
| 4,916,092 A * | 4/1990 | Tiegs et al. | 501/89 |
| 4,956,316 A | 9/1990 | Sawyer | 501/88 |
| 4,961,757 A | 10/1990 | Rhodes et al. | 51/309 |
| 5,017,528 A | 5/1991 | Tiegs et al. | 501/95 |
| 5,059,564 A | 10/1991 | Mehrotra et al. | 501/89 |
| 5,095,730 A | 3/1992 | Lauder | 72/347 |
| 5,232,318 A | 8/1993 | Santhanam et al. | 407/119 |
| 5,246,894 A | 9/1993 | Okuda et al. | 501/88 |
| 5,254,142 A | 10/1993 | Johansson et al. | 51/309 |
| RE34,446 E | 11/1993 | Wei | 501/95 |
| 5,264,297 A | 11/1993 | Jindal et al. | 428/698 |
| 5,376,600 A | 12/1994 | Tiegs | 501/95 |
| 5,389,586 A | 2/1995 | Rogers et al. | 501/87 |
| 5,439,854 A | 8/1995 | Suzuki et al. | 501/91 |
| 5,449,647 A | 9/1995 | Brandt | 501/95 |
| 5,538,926 A * | 7/1996 | Tsuchida et al. | 501/89 |
| 5,601,764 A * | 2/1997 | Suzuki et al. | 501/91 |
| 5,618,510 A | 4/1997 | Okada et al. | 423/346 |
| 5,656,217 A | 8/1997 | Rogers et al. | 264/640 |
| 5,656,561 A | 8/1997 | Rogers et al. | 501/87 |
| 5,676,918 A | 10/1997 | Okada et al. | 423/346 |
| 5,688,729 A * | 11/1997 | Andersson et al. | 501/89 |
| 5,733,829 A | 3/1998 | Tange et al. | 501/95.1 |
| 5,955,390 A | 9/1999 | Mehrotra et al. | 501/87 |
| 6,204,213 B1 | 3/2001 | Mehrotra et al. | 501/95.3 |
| 6,248,681 B1 * | 6/2001 | Kato | 501/87 |
| 6,620,756 B2 * | 9/2003 | Mah et al. | 501/152 |

OTHER PUBLICATIONS

Milewski et al., "Whiskers" Los Alamos Scientific Lab, New Mexico pp. 446–464.

(Continued)

*Primary Examiner*—Archene Turner
(74) *Attorney, Agent, or Firm*—John J. Prizzi (57) ABSTRACT

A ceramic composite made by compacting a starting powder blend. The composite includes between about 50 volume percent and about 99 volume percent of a ceramic matrix; and between about 1 volume percent and about 50 volume percent as-processed silicon carbide whiskers. The ceramic composite having a fracture toughness ($K_{IC}$) of greater than about 4.0 MPam$^{1/2}$. The ceramic has a silicon carbide whisker density as measured in whiskers per square millimeter equal to or less than about 1500 times the volume percent of silicon carbide whiskers, but in a density sufficient for the ceramic composite to have the fracture toughness.

44 Claims, 5 Drawing Sheets

OTHER PUBLICATIONS

Akatsu et al., "Effects of Whisker Content and Dimensions on the R-curve Behavior of an Alumina Matrix Composite Reinforced with Silicon Carbide Whiskers", J. Mater,Res., vol. 16, No. 7, Jul. 2001 pp.

Becher et al., "Influence of Reinforcement Content and Diameter on the R-Curve Response in SiC-Whisker-Reinforced Alumina", J. Am. Ceram. Soc. 79 [2] pp. 298-304.

Becher et al., "Toughening Behavior in Whisiker-Reinforced Ceramic Matrix Composites", J. Am. Ceram. Soc., 71 [2] (1998) pp. 1050-1061.

Whitney et al., "New And Improved Cutting Tool Materials" Technical Report AFML-TR-60-50 Mar. 1989 pp. 6-7, 114, 119-128, 160-161, 186-188, 196-197, 368-369.

Tiegs et al., "Sintered $Al_2O_3$—SiC—Whisker Composites" Am. Ceram. Soc. Bull., 66 [2] pp. 339-342 (1987).

Pred, "Silicon Nitride Whisker and Silicon Carbide Whisker of Tateho Chemical Industries Co., LTD." Distributed in the U.S. by ICD pp. 1-26.

Tamari et al., "Fabrication of Silicon Carbide Whisker-Silicon Nitride Composite Materials and Their Physical Properties" Translation: Osaka Kogyo Gijutsu Shikensho Kiho, 33 (2):129-134, 1962, pp. 1-11.

TOKAWHISKER Silicon Carbide Whisker Brochure, Tokai Carbon Co., LTD. 1995.

* cited by examiner

CERAMIC BODY REINFORCED WITH COARSE SILICON CARBIDE WHISKERS AND METHOD FOR MAKING THE SAME

FIELD OF THE INVENTION

The present invention pertains to a ceramic body, and a method of making the same, that has whisker reinforcement. More specifically, the invention pertains to a ceramic cutting tool (coated or uncoated), and a method for making the same, that has as-processed coarse silicon carbide whisker reinforcement wherein the ceramic matrix comprises any one or more of alumina, a carbide, nitride and/or carbonitride of titanium, hafnium, molybdenum, zirconium, tantalum, niobium, vanadium and/or tungsten. The invention also pertains to the as-processed coarse silicon carbide whiskers themselves, as well as a method of processing as-received coarse silicon carbide whiskers to produce the as-processed coarse silicon carbide whiskers.

BACKGROUND OF THE INVENTION

In the past, there have been ceramic matrices (e.g. alumina, boron carbide, and mullite) with silicon carbide whisker reinforcement such as that disclosed in U.S. Pat. No. 4,543,345 to Wei (U.S. Reissue Pat. No. 32,843 [reissued on Jan. 24, 1989] and No. 34,446 [reissued on Nov. 16, 1993] to Wei). According to the Wei patent, the incorporation of silicon carbide whiskers increased the fracture toughness of the ceramic body. The Wei patent mentions two specific kinds of silicon carbide whiskers; namely, the grade F9 (or SC-9) silicon carbide whiskers from ARCO (now Advanced Composite Materials Corporation of Greer, S.C.) and "Tokamax" silicon carbide whiskers from Tokai Carbon Company, Tokyo, Japan. The average diameter of these whiskers was 0.6 micrometers with a length of 10–80 micrometers and an average aspect ratio of 75.

There have also been ceramic cutting tools with silicon carbide whisker reinforcement. In this regard, U.S. Pat. No. 4,789,277 to Rhodes et al. entitled METHOD OF CUTTING USING SILICON CARBIDE WHISKER REINFORCED CERAMIC CUTTING TOOLS and U.S. Pat. No. 4,961,757 to Rhodes et al. for REINFORCED CERAMIC CUTTING TOOLS each disclose the use of silicon carbide whiskers (the content ranges from 2 volume percent to 40 volume percent) alumina matrix. The alumina matrix may be "doped" with up to 30% zirconia, hafnia and titanium carbide. The particular silicon carbide whiskers disclosed in these Rhodes et al. patents are silicon carbide whiskers made by the Advanced Materials group of ARCO Chemical Company (now Advanced Composite Materials Corporation of Greer, S.C.). These silicon carbide whiskers have an average diameter of about 0.6 micrometers and an aspect ratio on the order of 15–150.

PCT/US 86/00528 Patent Application to Rhodes et al. entitled HIGH DENSITY REINFORCED CERAMIC BODIES AND METHOD OF MAKING SAME has as its focus the pressureless sintering of whisker-reinforced ceramic bodies. This document mentions a whisker content of between 0.5 and 21 volume percent. The specific examples teach the use of an alumina matrix with SiC whisker contents from 6.1 volume percent to 29.2 volume percent. This document mentions that the silicon carbide whiskers have lengths equal to 10–100 micrometers and average diameters on the order of 1.0 micrometer or less. The example shows SiC whiskers with a length of 10–80 micrometers and a diameter equal to 0.6 micrometers.

U.S. Pat. No. 5,656,217 to Rogers et al. discloses pressureless sintering of ceramics reinforced with silicon carbide whiskers. The as-received silicon carbide whiskers are monocrystalline and have a diameter between about 0.4 to about 0.6 micrometers and an aspect ratio equal to 15–150. U.S. Pat. No. 5,389,586 to Rogers et al. entitled PRESSURELESS SINTERING OF WHISKER REINFORCED COMPOSITES suggests using the silicon carbide whiskers disclosed in U.S. Pat. No. 4,961,757 to Rhodes et al.

U.S. Pat. No. 5,059,564 to Mehrotra et al. for an ALUMINA-TITANIUM CARBIDE-SILICON CARBIDE COMPOSITION pertains to an alumina-based matrix containing a dispersion of SiC whiskers and a TiC phase. The SiC whiskers comprise 1.0 to less than 30 volume percent with the most preferred range being 2.5 to 20 volume percent. The silicon carbide whiskers have a diameter equal to 0.3 to 0.7 micrometers and a length of 20 to 50 micrometers. The TiC comprises 5 to 40 volume percent, and preferably, with up to 3 volume percent of a sintering aid residue.

U.S. Pat. No. 5,439,854 to Suzuki et al. pertains to a cutting tool that contains 40 weight percent or more of TiC, and 5 to 40 weight percent of silicon carbide whiskers (of a length equal to 1–20 micrometers and a diameter equal to 0.2–1.5 micrometers. The cutting tool may also contain up to 40 weight percent alumina, as well as sintering aids. Up to 40 weight percent of the TiC may be substituted by Ti or a Ti-based compound such as a nitride, boride, or oxide.

U.S. Pat. No. 5,955,390 to Mehrotra et al. (and U.S. Pat. No. 6,204,213 to Mehrotra et al.) pertains to a ceramic composite that comprises a matrix and ceramic whisker reinforcement. The examples include a titanium carbide-alumina matrix with silicon carbide whisker reinforcement, a titanium carbonitride-alumina matrix with silicon carbide whisker reinforcement, and a titanium molybdenum carbide-alumina matrix with silicon carbide whiskers. This patent discloses two kinds of silicon carbide whiskers. The first are Tokai silicon carbide whiskers that have an average length equal to 20–50 micrometers with an average diameter equal to 0.3 to 1 micrometers. The second are the SC-9 silicon carbide whiskers that had an average length equal to 10–80 micrometers and an average diameter equal to 0.6 micrometers.

U.S. Pat. No. 5,754,142 to Johnsson et al. pertains to SiC whisker reinforced alumina cutting tools. The '142 patent describes the whiskers as comprising monocrystals with a diameter of 0.2–10 micrometers and a length of 2.5–100 micrometers with a length to diameter ratio preferably of 5–30.

U.S. Pat. No. 4,956,316 to Sawyer concerns a silicon carbide whisker reinforced material. The silicon carbide whiskers used in Sawyer are single crystals containing alpha, beta and mixed alpha and beta phases of silicon carbide. The average diameter of the whiskers is about 0.6–2 micrometers and the length about 10–80 micrometers. It is preferred that the aspect ratio of the whiskers be less than about 30.

U.S. Pat. No. 4,867,761 to Brandt et al. discloses silicon carbide whiskers that comprise of monocrystals with a diameter of 0.5–10 micrometers and a length of 2.5–100 micrometers characterized thereof that the length/diameter ratio preferably is 5–10.

In the past, silicon carbide whiskers have been subjected to ball milling. In this regard, U.S. Pat. No. 5,376,600 to Tiegs teaches extensive ball milling. However, in describing prior processes, the '600 patent mentions ball milling for as short a duration as 0.5 hours to lower the size distribution. U.S. Pat. No. 5,449,647 to Brandt teaches that the aspect ratio can be controlled by ball milling.

In the past, silicon carbide whiskers have been subjected to heat treatments. For example, U.S. Pat. No. 5,017,528 to Tiegs et al. concerns the treatment of silicon carbide whiskers. This patent shows heat treating SiC whiskers in an oxygen sparaging atmosphere.

Table I set forth below presents certain physical properties of some prior art commercial cutting tools.

TABLE I

Selected Physical Properties Of Certain Commercial Cutting Tools

| Cutting Tool | Hardness HRA | VHN (GPa) 18.5 Kg Load | $K_{IC}$ (E&C) MPam½ |
|---|---|---|---|
| WG-300 | 94.6 | 19.4 | 6.5–7.5 |
| HC6 | 94.6 | 19.4 | 5.1 |
| K090 | 94.8 | 19.1 | 4.7 |

Referring to these commercial cutting tools, the WG-300 cutting tool is sold by Greenleaf Corporation of Saegertown, Pa. and has a composition of about 25 volume percent to about 30 volume percent SiC whiskers and the balance alumina. The HC6 cutting tool is sold by NTK Cutting Tool Division of NGK Spark Plugs (USA), Inc. of Farmington Hills, Mich., and has a composition of about 70 weight percent TiC and the balance alumina. The K090 cutting tool is made by Kennametal Inc. of Latrobe, Pa. and has a composition of about 70 volume percent alumina and 30 volume percent TiC. Each of these compositions may also contain minor amounts of one or more sintering aids. Although not listed in Table I above, commercial grade CC670 is sold by Sandvik Coromant. Grade CC670 is another silicon carbide whisker-reinforced alumina cutting tool that has a composition substantially identical to the composition of WG-300.

As can be seen by a review of the above documents, the predominant type of silicon carbide whisker used as a reinforcement for ceramics matrices, and especially the ceramic matrix in a cutting tool, is a finer diameter monocrystalline silicon carbide whisker that has an average diameter of about 0.6 micrometers and an average length of about 10 to about 80 micrometers and an average aspect ratio of about 75. These finer diameter silicon carbide whiskers are more expensive than as-received coarse silicon carbide whiskers (i.e., silicon carbide whiskers that have a so-called coarse morphology). Heretofore, as-received coarse silicon carbide whiskers have not been satisfactorily employed as reinforcement in ceramic matrices, and especially in ceramic matrices of cutting tools.

Typically, coarse morphology silicon carbide whiskers have an average diameter of between about 1.2 to about 1.7 micrometers and an average aspect ratio of between about 6 and about 10. These coarse morphology silicon carbide whiskers also have a high percentage of silicon carbide clusters (also known as mat) wherein these clusters may comprise up to about 20 weight percent of the silicon carbide whiskers and have a size as high as 50 micrometers. Scanning electron microscopy (SEM) has shown that this mat is actually silicon carbide whiskers bonded together by silica. The bond between these silicon carbide whiskers and the silica is relatively strong so that techniques like ultrasonication or the use of chemical dispersants will not break up the mat. These coarse morphology silicon carbide whiskers also have a rough surface wherein the surface area (BET) may be greater than about 3 square meters per gram. These coarse morphology silicon carbide whiskers also may have a high percentage of free silica wherein the silica comprises about 3 (or possibly up to about 5) weight percent of the silicon carbide whiskers.

The presence of the silica mat is disadvantageous to the effective reinforcement of the matrix by the silicon carbide whiskers. The same is true for the high free silica content. The rough surface (i.e., high surface area) of the silicon carbide whisker also is disadvantageous to the effective reinforcement of a ceramic matrix by the as-received coarse silicon carbide whiskers. Ineffective reinforcement may be due to any one or more of low density, reduced hardness or reduced fracture toughness of the ceramic composite.

It would be desirable to provide a method to process as-received coarse silicon carbide whiskers so that these whiskers would be suitable for use as a reinforcement in ceramic matrices. More specifically, it would be desirable to provide a method that processes the as-received coarse silicon carbide whiskers so as to reduce (or even eliminate) the content of the mat in the silicon carbide whiskers. It would also be desirable to provide a method that processes the as-received coarse silicon carbide whiskers that reduces (or even eliminates) the free silica content. Finally, it would be desirable to provide a method that processes the as-received coarse silicon carbide whiskers so as to reduce the surface roughness of the silicon carbide whiskers.

SUMMARY OF THE INVENTION

In one form, the invention is a ceramic cutting tool comprising a ceramic composite. The composite has a rake face and a flank face that intersect to form a cutting edge. The composite is made by compacting a starting powder blend. The blend comprises between about 50 volume percent and about 99 volume percent of a ceramic matrix, and between about 1 volume percent and about 50 volume percent as-processed silicon carbide whiskers. The ceramic composite has a fracture toughness ($K_{IC}$) of greater than about 4.0 MPam$^{1/2}$. The ceramic composite has a silicon carbide whisker density as measured in whiskers per square millimeter equal to or less than about 1500 times the volume percent of silicon carbide whiskers, but in a density sufficient for the ceramic composite to have the fracture toughness.

In yet another form, the invention is a coated ceramic cutting tool that includes a substrate. The substrate has a rake face and a flank face that intersect to form a cutting edge. The substrate comprises a ceramic matrix wherein the ceramic matrix comprises between about 50 volume percent and about 99 volume percent of the substrate. The substrate includes silicon carbon whiskers. The substrate has a fracture toughness ($K_{IC}$) of between about 4.0 MPam$^{1/2}$ and about 8.0 MPam$^{1/2}$. The substrate has a silicon carbide whisker density as measured in whiskers per square millimeter equal to or less than about 1500 times the volume percent of silicon carbide whiskers, but in a density sufficient for the substrate to have the fracture toughness. A coating is on at least a portion of the substrate.

In another form the invention is a ceramic composite that comprises a substrate wherein the substrate comprises a ceramic matrix and silicon carbide whiskers. The ceramic matrix comprises between about 50 volume percent and about 99 volume percent of the substrate. The silicon carbide whiskers comprise between about 1 volume percent and about 50 volume percent of the substrate. The ceramic substrate has a fracture toughness ($K_{IC}$) between about 4.0 MPam$^{1/2}$ and about 8.0 MPam$^{1/2}$. The substrate has a silicon carbide whisker density as measured in silicon carbide whiskers per square millimeter equal to or less than about 1500 times the volume percent of silicon carbide whiskers, but in a density sufficient for the substrate to have the fracture toughness.

In still another form, the invention is a method of making a ceramic composite comprising the steps of: providing as-processed silicon carbide whiskers having the following properties: an average length of between about 8 micrometers and about 60 micrometers; an average diameter of greater than or equal to about 1.2 micrometers; an average aspect ratio of between about 3 and 50; an oxygen content of less than about 2 weight percent of the silicon carbide whiskers; and a surface area of between about 1 square meters per gram and about 2 square meters per gram; blending a mixture of the as-processed silicon carbide whiskers, a sintering aid, and one or more ceramic powders; and compacting the blended powders into the ceramic composite wherein the ceramic composite has a fracture toughness ($K_{IC}$) of between about 4.0 MPam$^{1/2}$ and about 8.0 MPam$^{1/2}$, and the ceramic composite has a silicon carbide whisker density as measured in whiskers per square millimeter equal to or less than about 1500 times the volume percent of silicon carbide whiskers, but in a density sufficient for the ceramic composite to have the fracture toughness.

In still another form, the invention is a method of treating as-received silicon carbide whiskers having the following properties: an oxygen content of about 3 to about 5 weight percent, a surface area of greater than about 3 square meters per gram, comprising the step of: heat treating the as-received silicon carbide whiskers at a temperature between about 1400 degrees Centigrade and about 1900 degrees Centigrade for a duration between about 15 minutes and about 60 minutes to form heat treated silicon carbide whiskers having the following properties: an oxygen content of less than about 2 weight percent of the silicon carbide whiskers, a surface area below about 2 square meters per gram.

In another form the invention is a lot of silicon carbide whiskers having the following properties: an average length of between about 10 micrometers and about 60 micrometers; an average diameter of greater than or equal to 1.2 micrometers; an average aspect ratio of between about 6 and about 50; an oxygen content of less than 2 weight percent of the silicon carbide whiskers; and a surface area below about 2 square meters per gram.

Finally, in another form the invention is a ceramic cutting tool that comprises a ceramic composite having a rake face and a flank face, the rake face and the flank face intersect to form a cutting edge. The ceramic composite is made by compacting a starting powder blend comprising between about 50 volume percent and about 99 volume percent of a ceramic matrix. The ceramic composite has a fracture toughness ($K_{IC}$) of greater than about 4.0 MPam$^{1/2}$. The ceramic composite has a silicon carbide whisker density as measured in whiskers per square millimeter equal to or less than the value along the line A–B of FIG. 8 corresponding to the content of the silicon carbide whiskers, but in a density sufficient for the ceramic composite to have the fracture toughness.

BRIEF DESCRIPTION OF THE DRAWINGS

The following is a brief description of the drawings wherein these drawings form a part of this patent application.

DETAILED DESCRIPTION OF SPECIFIC EMBODIMENTS

The invention pertains to a ceramic composite body (e.g., a cutting tool or a wear part) that includes a ceramic matrix and as-processed coarse silicon carbide whiskers as a reinforcement for the matrix. The ceramic body may be used as a cutting tool or in various wear applications. In the context of a ceramic cutting tool, the combination of the matrix and the whiskers comprise a ceramic substrate. The substrate may be either coated or uncoated. The invention also pertains to a method of making the coated or uncoated ceramic body.

The invention also pertains to the as-processed coarse silicon carbide whiskers themselves. The invention further concerns a method of processing the as-received coarse silicon carbide whiskers to produce the as-processed coarse silicon carbide whiskers.

As earlier mentioned, the ceramic cutting tool substrate may optionally be coated with a hard material. Examples of such hard materials include (without limitation) alumina, titanium carbide, titanium nitride, titanium carbonitride, titanium aluminum nitride, cubic boron nitride and diamond and their combinations. The coating may be applied by various techniques.

For example, the coating may be applied by chemical vapor deposition (CVD) [see U.S. Pat. No. 4,801,510 to Mehrotra et al. for ALUMINA COATED SILICON CARBIDE WHISKER-ALUMINA COMPOSITION] or physical vapor deposition (PVD) [see U.S. Pat. No. 5,264,297 to Jindal et al. for PHYSICAL VAPOR DEPOSITION OF TITANIUM NITRIDE ON A NONCONDUCTIVE SUBSTRATE] or a scheme where some layers are applied by PVD and some layers are applied by CVD (see U.S. Pat. No. 5,232,318 to Santhanam et al. for COATED CUTTING TOOLS). It should be appreciated that the substrates that have a high titanium carbide or titanium carbonitride content, i.e., at least 25 to 30 volume percent titanium carbide or titanium carbonitride, are electrically conductive to such an extent that they are particularly suitable for PVD coating, as well as EDM machining.

Referring to the ceramic matrix, the matrix typically comprises between about 50 volume percent to about 99 volume percent of the total ceramic substrate. More preferably, the ceramic matrix comprises between about 65 volume percent and about 85 volume percent of the total ceramic substrate. Most preferably, the ceramic matrix comprises between about 75 volume percent and about 80 volume percent of the total ceramic substrate.

In regard to the materials for the matrix of the substrate, as one alternative, the matrix may comprise a carbide, carbonitride and/or nitride (along with the residue of one or more sintering aids) of one or more of titanium, hafnium, molybdenum, zirconium, tantalum, niobium, vanadium and/or tungsten so that this component is between about 50 volume percent to about 99 volume percent or more of the matrix.

As another alternative, the matrix may comprise only alumina and the residue of one or more sintering aids.

As still another alternative, the matrix may comprise titanium carbonitride and alumina along with the residue of one or more sintering aids. In this alternative, the titanium carbonitride may comprise at least greater than 50 volume percent of the matrix so that the matrix is titanium carbonitride-based that has a lesser amount of alumina. There are two specific compositions of preferred interest in this alternative. Table II below sets forth the starting components of each one of these components.

TABLE II

Starting Components [in Volume Percent] for Titanium Carbonitride-Based Alumina Composites with Coarse Silicon Carbide Whisker Reinforcement

| Material | TiCN | C:N (by mole) | Alumina | SiC Whiskers | Yttria | TiCN:Alumina Volumetric Ratio |
|---|---|---|---|---|---|---|
| TK5 | 40.87 | 0.5:0.5 | 39.08 | 20.00 | 0.25 | 51:49 |
| TK6 | 38.12 | 0.5:0.5 | 36.63 | 25.00 | 0.25 | 51:49 |

For all of the specific examples set out above in Table II, the yttria ($Y_2O_3$) was supplied by Hermann C. Strack Berlin GmbH & Co, KG, P O Box 1229, D-7887 Lauterburg, Baden, Germany. The $Al_2O_3$ powder was supplied by Ceralox (a division of Vista Chemical Company) under the designation HPA-0.5. The Ceralox powder had a BET specific surface area of 10.0 to 11.5 square meters/gram. The as-received Ceralox $Al_2O_3$ contained an addition of 0.05 volume percent MgO. The Ceralox $Al_2O_3$ powder was substantially equiaxed. The titanium carbonitride powders were supplied by H. C. Starck Inc., 45 Industrial Place, Newton, Mass. 02161. This component has a formula of $TiC_{0.5}N_{0.5}$ and had an average particle size (FSSS) of 3.0–5.0 $\mu$m.

As still another alternative, any one of the above ceramic matrices may further include particulates dispersed therein. These particulates may include aluminum nitride, silicon nitride, titanium boride, zirconium boride, chromium boride, hafnium boride, alumina, zirconium oxide, and hafnium oxide. The content of these particulates may range between about 0.1 volume percent to about 49 volume percent of the matrix. More preferably, the content of these particulates may range between about 0.25 volume percent and about 25 volume percent of the matrix.

As mentioned above, the matrix includes sintering aid residues. The preferred content of the sintering aids is less than or equal to about 1 weight percent of the starting powders. A more preferable sintering aid content is less than or equal to about 0.5 weight percent of the starting powders. The most preferable sintering aid content is less than or equal to 0.25 weight percent of the starting powders. The preferred sintering aids include yttria, magnesia and zirconia either alone or in combination. The sintering aids may also include aluminum nitride and silicon nitride.

In regard to the ceramic whiskers used as reinforcement in the matrix, these whiskers are as-processed coarse silicon carbide whiskers. It is not unusual that the silicon carbide whiskers will include up to 20 volume percent silicon carbide particulates. The as-processed coarse silicon carbide whiskers comprise between about 1 volume percent and about 50 volume percent of the total ceramic composition.

These as-processed coarse silicon carbide whiskers are as-received coarse silicon carbide whiskers that have been processed according to the process of the present invention to produce the as-processed coarse silicon carbide whiskers. It is typical that as-received coarse silicon carbide whiskers have the following properties set out in Table III below.

TABLE III

Typical Properties of As-Received Silicon Carbide Whiskers

| Properties | Values |
|---|---|
| Average Whisker Length (micrometers) | 8–15 |
| Average Whisker Diameter (micrometers) | 1.2–2.0 |
| Average Whisker Aspect Ratio | 6–10 |
| Whisker Content (weight percent) | ≧80% |
| Particulate Size (mat) [$d_{50}$] | <20 $\mu$m |
| Whisker Surface Area (BET) [$m^2$/gram] | >3 |
| Free Carbon Content (weight percent) | 0.3 wt. % (maximum) |
| Free Silica Content (weight percent) | 4.0 wt % (maximum) |
| Oxygen Content (weight percent) | 4.0 wt % (maximum) |

TABLE III-continued

Typical Properties of
As-Received Silicon Carbide Whiskers

| Properties | Values |
| --- | --- |
| Extractable Calcium Ions | 100 ppm Maximum |
| Extractable Aluminum Ions | 200 ppm Maximum |

As mentioned above, these as-received coarse silicon carbide whiskers have not been satisfactorily used as reinforcement in a ceramic matrix, especially for applications as a ceramic cutting tool.

Applicants have invented a method by which these as-received coarse silicon carbide whiskers are processed so as to be suitable for use as a reinforcement in a ceramic matrix. Referring to the process, this process first comprises a heat treatment to reduce the oxygen content in the form of silica ($SiO_2$) of the whiskers and to reduce the surface roughness of the whiskers wherein the surface roughness is determined by measuring the surface area (BET). The resultant product of this first step is a heat-treated coarse silicon carbide whisker.

Second, the process comprises the low energy ball milling of the heat-treated coarse silicon carbide whiskers to break up the mat (i.e., silicon carbide whiskers bonded together by silica) whereby the mat is either eliminated or reduced without reducing the aspect ratio of the whiskers. The resultant product of the ball milling is an as-processed coarse silicon carbide whisker that has the preferred properties set forth below in Table IV.

TABLE IV

Preferred Properties of
As-Processed Silicon Carbide Whiskers

| Properties | Values |
| --- | --- |
| Mean Whisker Length (micrometers) | 8–15 |
| Mean Whisker Diameter (micrometers) | 1.2–2.0 |
| Mean Whisker Aspect Ratio | 6–10 |
| Whisker Content (weight percent) | ≧80% |
| Particulate Size (mat) [$d_{50}$] | <10 micrometers |
| Whisker Surface Area (BET) [$mm^2$/gram] | 1–2 |
| Oxygen Content (weight percent) | <2% |

It should be appreciated that applicants contemplate a broader range for the average aspect ratio wherein this ranges is between about 3 to about 50. A more preferred range for the average aspect ratio is between about 3 to about 10. A most preferred range for the average aspect ratio is between about 6 to about 8. The determination of the particulate size in the as-processed silicon carbide whiskers was based upon visual observation at a magnification of 500–1500× wherein there was no distinguished mat (i.e., no mat with a dimension (or size) greater than 10 micrometers).

In regard to the process of making the composite, the starting ceramic powders and as-processed coarse silicon carbide whiskers are blended together. The blend is then hot-pressed into the ceramic substrate. The hot pressing occurs in a vacuum or protective atmosphere at a temperature of between about 1400 degrees Centigrade and about 2000 degrees Centigrade at a pressure of between about 10 MPa and about 100 MPa and for a duration of between about 15 minutes and 120 minutes.

Figure 1:
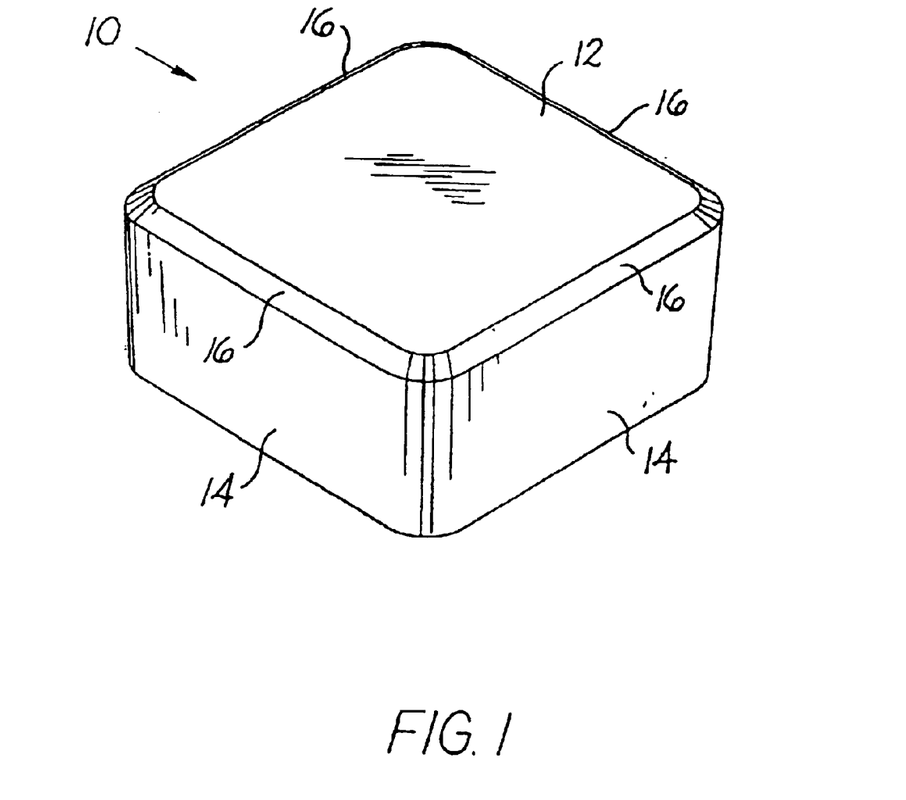
FIG. 1 is an isometric view of a cutting insert that comprises a specific embodiment of the cutting tool of the present invention.

Referring to FIG. 1 and the geometry of a specific embodiment of a ceramic cutting tool, there is illustrated a cutting tool generally designated as 10. Cutting tool 10 has a rake face 12 and a flank face 14. The rake face and the flank face intersect to form a cutting edge 16. The specific configuration is a SNGN-453T style of cutting insert with a T land according to the American National Standard for Cutting Tools-Indexable Inserts-Identification System, ANSI B212.4-1986 (cutting edge preparation: 0.002–0.004 inch×20 degrees chamfer). Other styles of cutting inserts and edge preparations are acceptable and are contemplated by the inventors to be within the scope of this invention.

As shown hereinafter, specific embodiments of the ceramic cutting tools comprise excellent cutting tools. In machining applications where abrasive wear resistance is more of a concern than chemical wear resistance, a titanium carbide-based matrix is preferable. If, however, chemical wear resistance is more important than abrasive wear resistance, then a hafnium carbide-based or titanium carbonitride-based matrix is preferable. Chemical wear resistance may also be improved by applying a hard coating to the cutting tool substrate. Exemplary coatings include (without limitation) titanium nitride, titanium carbonitride, titanium aluminum nitride, titanium carbide, and alumina.

For machining of nickel base super alloys, or for any workpiece in which a combination of high hardness and high chemical inertness is desired, it is more preferred that a titanium carbonitride ($TiC_xN_y$) based matrix be used in which x is greater that 0 but less than 0.95 and y+x=1. More preferably, y is greater than or equal to 0.5. For x=0, that is titanium nitride alone, the hardness may be reduced and there may be a reaction between the titanium nitride and the SiC whiskers during the high temperature fabrication of these materials. Therefore, y should be less than 0.95. Another range for x and y for the titanium carbonitride ($TiC_xN_y$) is that y is less than 0.90 and greater than or equal to 0.55, and x+y=1. Still another range for x and y for titanium carbonitride ($TiC_xN_y$) is that y is less than 0.75 and greater than or equal to 0.6, and x+y=1. One preferred composition for the titanium carbonitride is where x=0.5 and y=0.5. Examples of this composition are compositions TK5 and TK6 set out in Table II hereinabove. Optionally, titanium carbonitride may be replaced in whole or in part by hafnium carbonitride or zirconium carbonitride.

In order for the coarse silicon carbide whiskers to be suitable for use as reinforcement in the matrix they must first be processed according to the two step method described above. This method is now described in more detail below in connection with specific examples.

The first step is to take the as-received coarse silicon carbide whiskers and subject them a heat treatment. The purpose of this heat treat is to reduce the amount of oxygen (in the form of silica) on the surface of the whiskers. In this regard, the preferred oxygen content is less than about 1 weight percent. A more preferred oxygen content is below about 0.5 weight percent.

Another purpose of the heat treatment is to reduce the surface roughness of the whiskers as measured by surface area (BET). The preferred surface area (BET) is between about 1 and about 4 square meters per gram. A more preferred surface area (BET) is between about 1 and about 2 square meters per gram.

The temperature of the heat treatment ranges between about 1400 degrees Centigrade and about 1900 degrees Centigrade. A more preferred heat treatment temperature range is between about 1500 degrees Centigrade and about 1870 degrees Centigrade. When the temperature of heat treatment is below about 1500 degrees Centigrade the length of the heat treatment may become too long to practically achieve the desired result. When the temperature of the heat treatment is above 1870 degrees Centigrade there is more of a risk that there will be growth of the single crystal silicon carbide whiskers into polycrystalline silicon carbide fibers that would have a detrimental impact upon the material properties. The duration of the heat treatment ranges between about 15 minutes and about 120 minutes. A more preferred range of the duration is between about 30 minutes and about 60 minutes. The heat treatment occurs in an inert protective atmosphere (e.g. nitrogen or argon) or in a vacuum (e.g. less than 500 micrometers Hg).

Although applicants do not intend to be bound by any theory in regard to reducing the surface roughness, according to solid state sintering theory, areas on the surface of the whisker having a positive radius of curvature (convex) will have a relatively high vapor pressure, where areas on the surface of the whisker having a negative radius of curvature (concave) will have a relatively low vapor pressure. Difference in vapor pressure as a function of surface curvature is the driving force to transport materials from positive curvature areas to negative curvature areas. Such a process leads to the improvement in surface roughness of the silicon carbide whiskers. No shrinkage or densification will occur if the processing temperature is not too high. Too high a temperature will result in recrystallization of the single crystalline whiskers and also result in the sintering of the whiskers together. Thus, temperature and holding time must be carefully controlled in order to achieve optimized performance. Table V set forth below presents the results of various temperatures and durations and atmospheres on the properties of the as-received coarse silicon carbide whiskers.

TABLE V

Results of Heat Treating Coarse Silicon Carbide Whiskers at Different Heat Treating Parameters

| Lot # | Temp (° C.) | Duration (minutes) | Atmosphere | BET (m²/gram) | Oxygen Content (wt %) |
|---|---|---|---|---|---|
| WX0022-CLW | — | — | As Received | 4.43 | 1.85 |
| WX0022-CLW | 1400 | 45 | Argon | 3.18 | 1.79 |
| WX0022-CLW | 1900 | 30 | Argon | 2.22 | 0.70 |
| FB-SYN05-TT01 | — | — | As Received | 3.34 | 2.03 |
| FB-SYN05-TT01 | 1200 | 60 | Vacuum | 2.35 | 1.71 |
| FB-SYN05-TT01 | 1500 | 60 | Vacuum | 1.92 | 0.96 |
| FB-SYN05-TT01 | 1700 | 45 | Vacuum | 1.70 | 0.98 |
| FB-SYN05-TT01 | 1800 | 45 | Vacuum | 2.07 | 0.47 |
| FB-SYN05-TT01 | 1900 | 15 | Vacuum | 1.03 | 0.47 |

As can be seen from the results set out in Table V, the oxygen content and the surface roughness of the as-received coarse silicon carbide whiskers decreases upon being subjected to the heat treatment. Generally speaking, the reduction in the surface roughness and the oxygen content is the greatest as the temperature increases. Table VI sets forth the reduction (in percent) of the surface area (BET) and the oxygen content due to the heat treatment regardless of the particle whisker lot.

TABLE VI

Amount of Reduction of Oxygen Content and Surface Area (BET) Due to Heat Treatment

| Heat Treatment | Reduction in Oxygen Content (%) | Reduction in Surface Area BET (%) |
|---|---|---|
| 1200 | 29.6 | 15.8 |
| 1400 | 28.2 | 3.2 |
| 1500 | 42.5 | 52.7 |
| 1700 | 49.1 | 51.7 |
| 1800 | 38 | 77 |
| 1900 | 59.6 | 69.6 |
| [Average of Both Whisker Lots] | | |

Table VII below sets forth the impact of the heat treatment parameters on the fracture toughness of a titanium carbonitride-alumina-(30 volume percent) coarse silicon carbide composite.

TABLE VII

Impact of Heat Treatment on Fracture Toughness of Titanium Carbonitride-Alumina-(30 volume percent) Coarse Silicon Carbide Whisker Composite

| Mix No. | Temperature (° C.) | Time (Minutes) | Atmosphere | $K_{IC}$ (E&C) MPa · m½ |
|---|---|---|---|---|
| CB347-67 | Not Heat Treated | — | — | 6.02 |
| CB347-66 | 1900 | 30 | Argon | 6.59 |
| CB347-80 | Not Heat Treated | — | — | 5.95 |
| CB347-79 | 1900 | 30 | Argon | 6.74 |

The technique to measure the fracture toughness (Mpam1/2) is by Evans & Charles (Evans & Charles, "Fracture Toughness Determination by Indentation", J. American Ceramic Society, Vol. 59, Nos. 7–8, pages 371–372) using a 18.5 kg load. It can be seen that the heat treatment of the coarse silicon carbide whiskers results in an improvement in the fracture toughness of the composite. In averaging the improvement of the fracture toughness for the above examples, the heat treatment resulted in an improvement in the fracture toughness of about 10.4 percent as compared to a composite using as-received coarse silicon carbide whiskers. The ceramic composite was consolidated via hot pressing at a temperature of about 1875 degrees Centigrade, a pressure of about 35 MPa, a duration of about 60 minutes and in a vacuum.

Referring to the examples set out in Table VIII after completion of the heat treatment, the heat-treated coarse silicon carbide whiskers were next subjected to a low energy ball milling treatment. The purpose of the low energy ball milling was to reduce the silicon carbide mat content. The duration of the ball milling must be sufficient so as to reduce or eliminate the mat, but not so long as to damage the whiskers. The ball milling may last from between about 10 minutes to about 60 minutes. The more preferred range is between about 15 minutes and 45 minutes. The most preferred range is between about 30 minutes and about 40 minutes.

Table VIII below sets forth the impact of the low energy ball milling on the fracture toughness of the titanium carbonitride-alumina-coarse silicon carbide whisker composite. For each of the examples in Table VIII, the coarse silicon carbide whisker content was 30 volume percent. The ceramic composite was consolidated via hot pressing. The hot pressing parameters were as follows: a temperature of about 1875 degrees Centigrade at a pressure about 35 MPa for a duration of about 60 minutes under an atmosphere of vacuum.

TABLE VIII

Impact of Low Energy Ball Milling on Fracture Toughness of Titanium Carbonitride-Alumina-(30 Volume Percent) Coarse Silicon Whisker Composite

| Mix No. | Ball Milling Time (minutes) | $K_{IC}$ (E&C) MPa · m½ |
|---|---|---|
| CB347-27 | 0 | 5.74 |
| CB347-63 | 15 | 6.05 |
| CB347-54 | 30 | 7.45 |
| CB347-55 | 40 | 7.18 |
| CB347-56 | 60 | 6.97 |
| CB347-57 | 90 | 6.59 |

As can be seen from the results in Table VIII, a low energy ball milling time of 30 minutes appears to result in the greatest increase in fracture toughness for the titanium carbonitride-alumina-30 volume percent coarse silicon carbide whisker composite.

Figure 2:
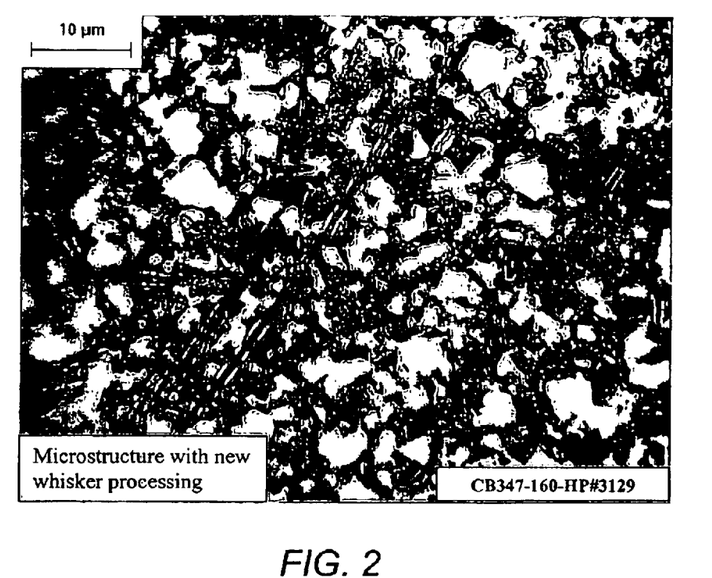
FIG. 2 is a photomicrograph of the microstructure of a ceramic composite comprising about 20 volume percent as-processed coarse silicon carbide whiskers and the balance titanium carbonitride-alumina wherein the silicon carbide whiskers were processed according to the present invention and the photomicrograph has a 10 micrometer scale.
Figure 3:
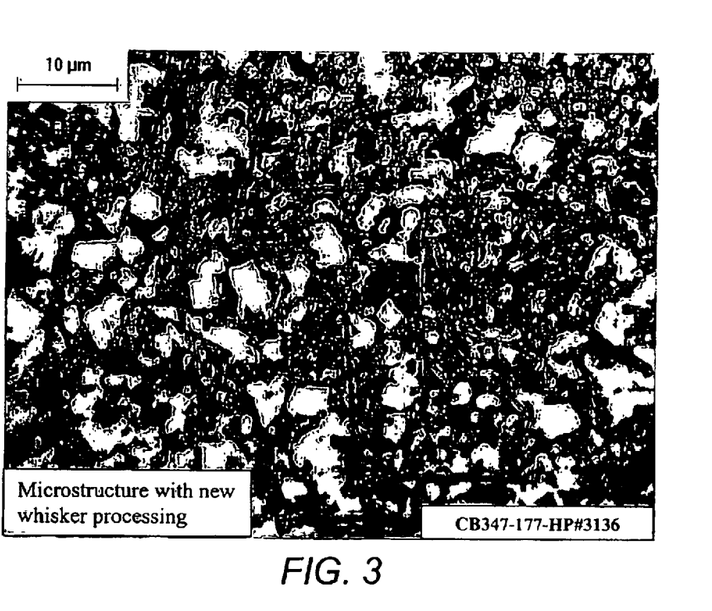
FIG. 3 is a photomicrograph of the microstructure of a ceramic composite comprising about 25 volume percent as-processed coarse silicon carbide whiskers and the balance titanium carbonitride-alumina wherein the silicon carbide whiskers were processed according to the present invention and the photomicrograph has a 10 micrometer scale.

Referring to the photomicrographs, FIGS. 2 and 3 show the microstructure of the titanium carbonitride alumina composites reinforced with the as-processed coarse silicon carbide whiskers. These photomicrographs show that the coarse silicon carbide whiskers are homogenously distributed on the titanium carbonitride-alumina matrix and no visual silicon carbide whisker mat can be seen.

Figure 4:
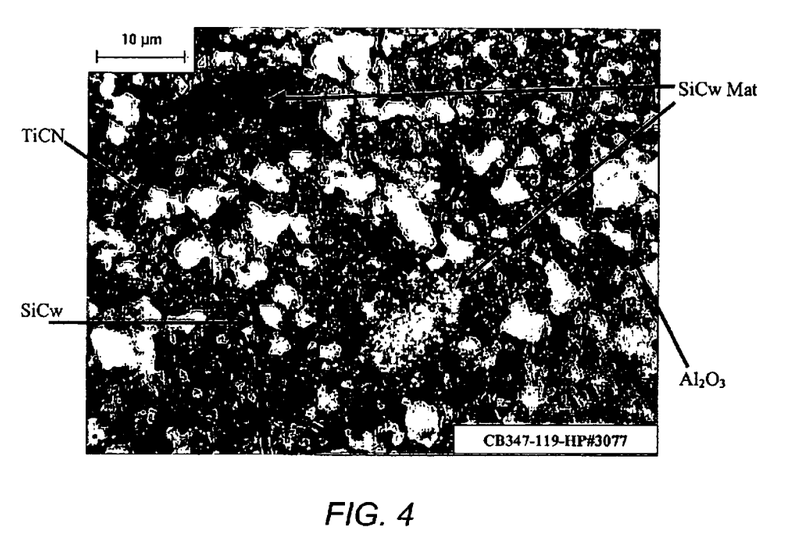
FIG. 4 is a photomicrograph of the microstructure of a ceramic composite comprising about 30 volume percent as-received coarse silicon carbide whiskers and the balance titanium carbonitride-alumina wherein the silicon carbide whiskers were not processed according to the present invention and the photomicrograph has a 10 micrometer scale.
Figure 5:
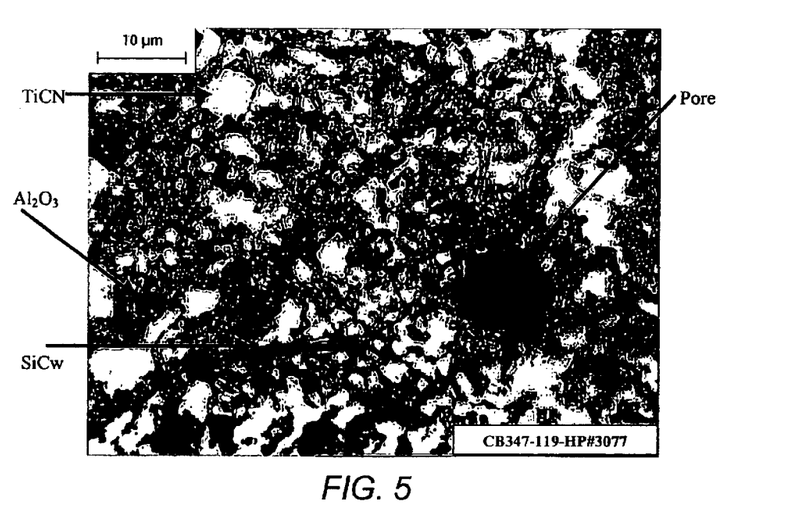
FIG. 5 is a photomicrograph of the microstructure of a ceramic composite comprising about 30 volume percent as-received coarse silicon carbide whiskers and the balance titanium carbonitride-alumina wherein the silicon carbide whiskers were processed according to the present invention and the photomicrograph has a 10 micrometer scale.

FIGS. 4 and 5 show the microstructure for a titanium carbonitride-based ceramic substrate containing alumina and as-received coarse silicon carbide whiskers. These photomicrographs show the clusters of the silicon carbide whiskers and the porosity that is stemmed from the silicon carbide whisker mat. It is the silicon carbide whisker mat (and porosity) that result in a low sintered density, a lower hardness, and a reduced fracture toughness.

Figure 6:
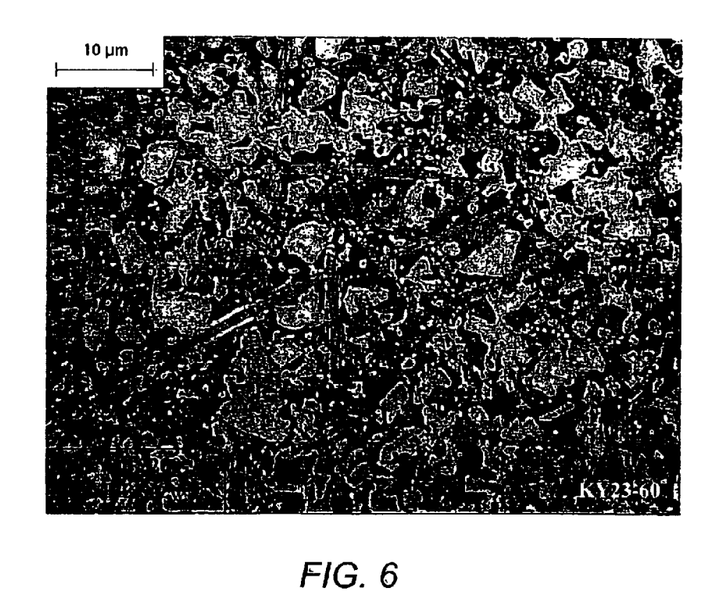
FIG. 6 is a photomicrograph of the microstructure of a prior art ceramic composite comprising about 25 volume percent as-received fine diameter silicon carbide whiskers obtained from Advanced Composite Materials Corporation of Greer, S.C., and the balance titanium carbonitride-alumina and the photomicrograph has a 10 micrometer scale.

FIG. 6 shows the microstructure for a titanium carbonitride-alumina composite reinforced with fine diameter silicon carbide whiskers. The silicon carbide whiskers in this composite are much finer than those in FIGS. 2 and 3.

Figure 7:
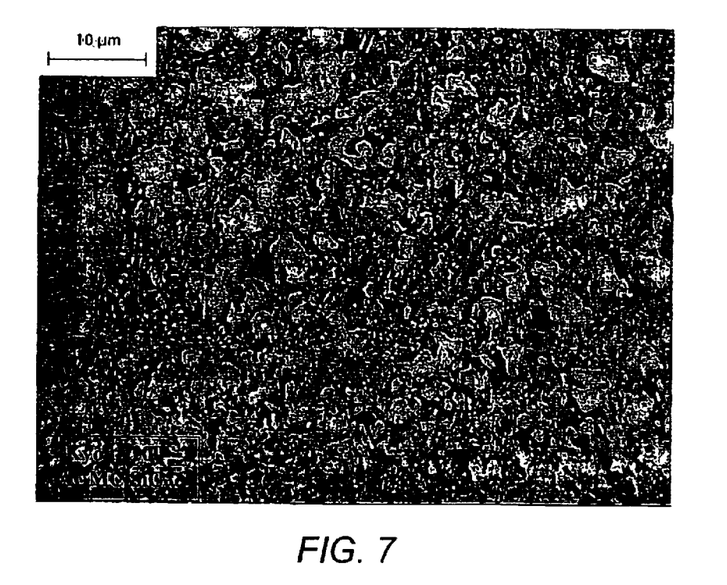
FIG. 7 is a photomicrograph of the microstructure of a prior art ceramic cutting tool principally comprised of fine diameter silicon carbide whiskers (believed to be obtained from Advanced Composite Materials Corporation of Greer, S.C.) and alumina, and sold by Greenleaf Corporation of Saegertown, Pa. USA under the designation WG-300.

FIG. 7 shows the microstructure of the WG-300 material made by Greenleaf Corporation of Saegertown, Pa. As best understood, this material has a composition of about 65 to about 70 volume percent alumina and about 25 to about 30 volume percent silicon carbide whiskers. The silicon carbide whiskers are supplied from Advanced Composite Materials Corporation and have an average diameter of about 0.6 micrometers, an average length of between about 30 and about 60 micrometers, and an aspect ratio of 75. This photomicrograph shows differences in microstructure. In FIGS. 2 and 3, the matrix is titanium carbonitride-alumina and the microstructure is much coarser, the reinforced silicon carbide whiskers are much coarser (compared with FIG. 7). While in FIG. 7, the matrix is alumina and the microstructure is very fine, the reinforced silicon carbide whiskers are much finer.

The silicon carbide whisker density of the titanium carbonitride (38.12 volume percent)-alumina (36.63 volume percent)-silicon carbide whiskers (25 volume percent) composites like FIG. 3 and of FIG. 6 was measured in the following way. The silicon carbide whiskers in each one of 17 images of a size 66.26 micrometers×49.70 micrometers (3.2929×10⁻³ mm²) was manually counted so as to determine a mean count and a standard error. Each image was viewed optically at a magnification of 1500× looking at a prepared surface in a plane perpendicular to the pressing axis. For the composite like FIG. 3, the mean count was 99 whiskers with a standard error equal to 4.0. This equated to a silicon carbide whisker density of 30,065 whiskers per square millimeter or 1202 whiskers per square millimeter per one volume percent of whiskers. For the composite like FIG. 6, the mean count was 183 whiskers with a standard error equal to 6.0. This equated to a silicon carbide whisker density of 55,574 whiskers per square millimeter or 2223 whiskers per square millimeter per one volume percent of whiskers. The toughness of these composites was measured using the Evans & Charles technique. Table IX below sets out the silicon carbide whisker density in the number of whiskers per square millimeter, the toughness ($K_{IC}$) in MPam$^{1/2}$ and the density of the ceramic composite as a percentage of theoretical density of 4.226 grams/cubic centimeter.

TABLE IX

Selected Properties of Titanium Carbonitride-Alumina-Silicon Carbide (25 volume percent) Composites Like FIG. 3 and FIG. 6

| Composite | SiC Whiskers | SiCw Density (Whiskers/ mm²) | Fracture Toughness ($K_{IC}$) [MPam½] | Density (% of Theoretical) |
|---|---|---|---|---|
| FIG. 3 | Coarse | 30,065 | 7 | ≧99.5% |
| FIG. 6 | Fine | 55,574 | 7.5 | ≧99.5% |

As it is apparent from the results in Table IX above, the number of fine silicon carbide whiskers per unit area in a titanium carbonitride-alumina-silicon carbide whisker (25 volume percent) composite is about 1.85 times as many as the number of coarse silicon carbide whiskers in a composite with the same composition.

In regard to the silicon carbide whisker density, applicants contemplate that the silicon carbide whisker density as measured in whiskers per square millimeter is equal to or less than an about 1500 times the volume percent of silicon carbide whiskers. Another silicon carbide whisker density in silicon carbide whiskers per square millimeter is equal to or less than about 1400 times the volume percent of silicon carbide whiskers.

Figure 8:
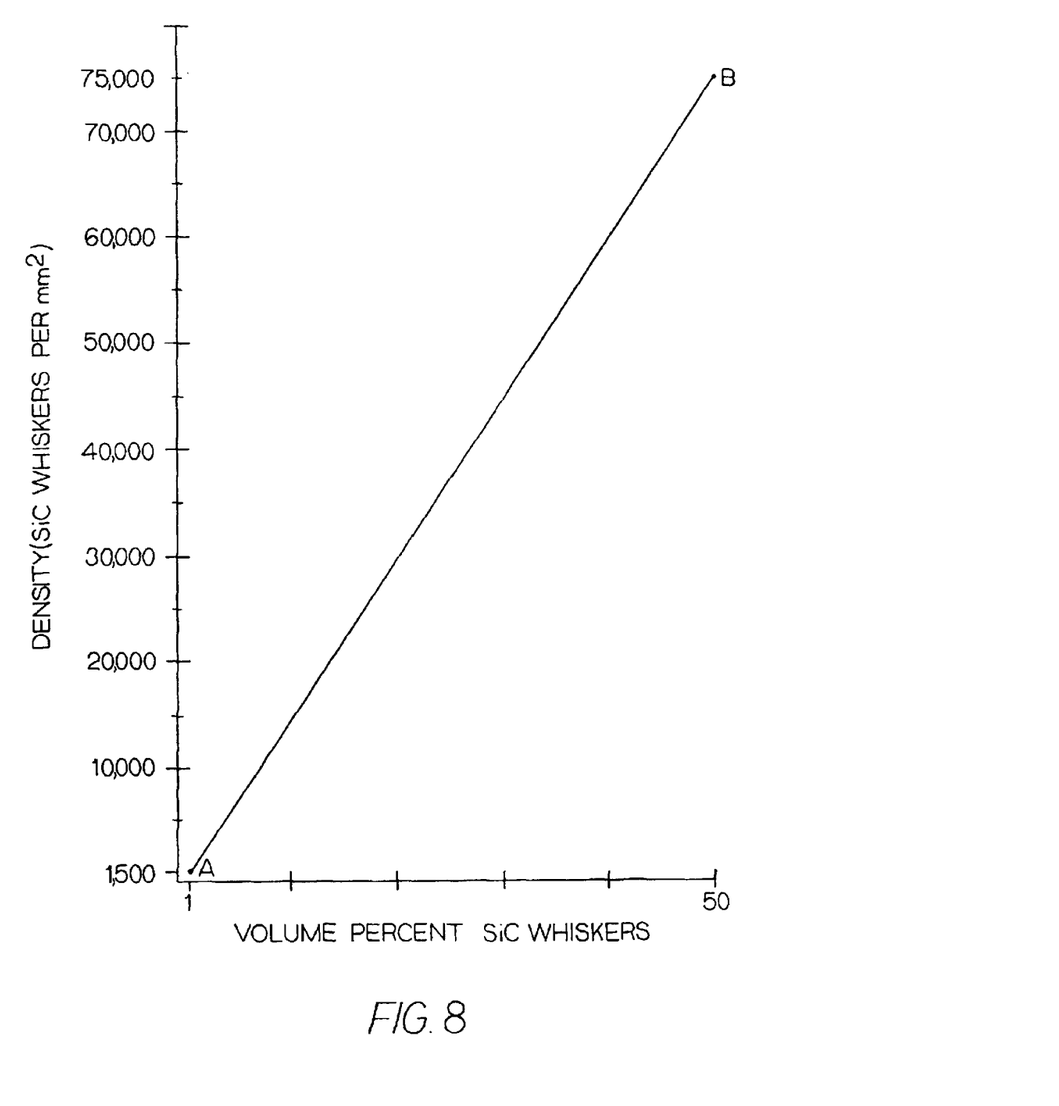
FIG. 8 is a graph that shows the relationship between the volume percent of silicon carbide whiskers in the ceramic composite (the horizontal axis) and the density of the silicon carbide whiskers as measured in silicon carbide whiskers per square millimeter (the vertical axis), and having Points A and B shown wherein Point A represents a composite with 1 volume percent of silicon carbide whiskers and a density of 1500 silicon carbide whiskers per square millimeter and Point B represents a composite with 50 volume percent silicon carbide whiskers and a density of 75,000 silicon carbide whiskers per square millimeter.

Applicants also contemplate that the silicon carbide whisker density would be approximately proportional to the volume percent of silicon carbide whiskers. In this regard, FIG. 8 is a graph that shows the relationship between the volume percent of silicon carbide whiskers in the ceramic composite (the horizontal axis) and the density of the silicon carbide as measured in silicon carbide whiskers per square millimeter (the vertical axis). FIG. 8 shows Points A and B. Point A represents a composite with 1 volume percent of silicon carbide whiskers and a density of 1500 silicon carbide whiskers per square millimeter. Point B represents a composite with 50 volume percent silicon carbide whiskers and a density of 75,000 silicon carbide whiskers per square millimeter. For a ceramic composite that has a silicon carbide whisker content between 1 volume percent and 50 volume percent, the preferred silicon carbide whisker density (silicon carbide whiskers per square millimeter) is equal to or less than the density value as represented by the line A–B of FIG. 8.

Applicants also contemplate that the silicon carbide whisker density is between about 48 percent and about 60 percent of the silicon carbide whisker density of a comparative ceramic composite having the same ceramic matrix and same silicon carbide whisker content of fine silicon carbide whiskers wherein the fine silicon carbide whiskers have the following properties: an average diameter of about 0.6 micrometers, and an average length between about 30 and about 60 micrometers and an average aspect ratio of about 75.

Metalcutting tests were conducted to determine the performance of cutting tools made from the composites using the as-processed coarse silicon carbide whiskers. The compositions that were tested were TK5 and TK6 wherein the compositions are set out in Table II hereof. These examples had the as-received coarse silicon carbide whiskers processed as follows: a heat treatment in vacuum at a temperature of about 1500 degrees Centigrade for a duration of about 60 minutes. The heat treated silicon carbide whiskers were then ball milled for about 30 minutes.

In regard to the method of preparation for the examples, the alumina and yttria components of the ceramic matrix were blended in a mill with isopropanol for two hours. The titanium carbonitride was added and the mixture was blended for another two hours. The as-processed (i.e., heat treated and ball milled) silicon carbide whiskers were separately sonicated for two hours and then added to the blend of the other components. The silicon carbide whiskers were then blended with the blend of the balance of the components in a mill for 20 minutes. This blend was then discharged through a 40 mesh screen, dried in a rotary evaporator, and then passed through a 40 mesh screen. The dried blend was uniaxially hot pressed at a temperature of about 1850 degrees Centigrade for a duration of about 60 minutes at a pressure of 35 MPa under vacuum. The resulting product was ground into a particular style of cutting tool.

Referring to the results of the metalcutting tests, the cutting parameters had the following ranges: a speed between about 470 surface feet per minute [143 surface meters per minute] and about 1000 sfm [305 sm/m]; a feed between about 0.005 inches [0.127 millimeters] and 0.009 inches [0.23 mm] and a depth of cut ranging between about 0.05 inches to about 0.2 inches (1.27 mm to 5.08 mm). The workpiece materials included iron-based, nickel-based and cobalt-based superalloys such as, for example, HS188, Inconel 718, Inconel 625 and A286. The overall performance of the cutting tools of the invention (TK5 and TK6) was acceptable.

By using the coarser as-processed silicon carbide whiskers in the ceramic composite, applicants believe that they have developed a ceramic composite that has desired properties that are similar to the ceramic composites that use the finer silicon carbide whiskers, but with the added advantage of the potential to lower fabrication costs.

For example, the use of coarser silicon carbide whiskers, which have a larger average diameter (e.g., greater than or equal to about 1.2 micrometers) than the finer silicon carbide whiskers (e.g., an average diameter equal to about 0.6 micrometers), should increase the fracture toughness of the ceramic composite given the same silicon carbide whisker content. This would be expected to be the case because it takes a greater amount of force to break a larger diameter silicon carbide whisker than to break a smaller diameter silicon carbide whisker. In this regard, please see Becher et al., "Influence of Reinforcement content and diameter on the R-curve response in SiC-whisker-reinforced alumina", J. Am. Ceram. Soc., 79[2] pages 298–304 (1996), Becher et al., "Toughening behavior in whisker-reinforced ceramic matrix composites", J. Am. Ceram. Soc., 71[12] pages 1050–61 (1988); and Akatsu et al., "Effects of whisker content and dimensions on the R-curve behavior of an alumina matrix composite reinforced with silicon carbide whiskers", J. Mater. Res. 16[7] pages 1919–27 (2001).

The use of coarser as-processed silicon carbide whiskers should also result in a reduction of the total whisker surface area as compared to the use of finer silicon carbide whiskers. A reduction in the total surface area of the whiskers should result in a reduction of the surface oxygen content of the whiskers so that there should be better whisker pull-out in the ceramic composite. Better whisker pull-out results in improved fracture toughness for the ceramic composite.

In view of the expectation of better whisker pull-out through the use of coarse silicon carbide whiskers, fracture toughness values similar to those achieved with finer silicon carbide whiskers having an average diameter of 0.6 micrometers should be achieved at lower volume percent coarse silicon carbide whisker loadings. By using a lower volume percent of silicon carbide whiskers, there should be achieved improved chemical wear resistant in metalcutting applications due to the overall lower content of silicon carbide in the composite.

The lower density of silicon carbide whiskers per unit volume should also mean that higher volume percentages of silicon carbide whiskers can be used in ceramic composites with less of a chance of non-homogeneous whisker distribution occurring which adversely affects toughness. Applicants believe that tougher ceramic composite wear parts should be possible through the use of the coarse silicon carbide whiskers.

By using coarser silicon carbide whiskers in the ceramic composite, applicants expect that the process of producing the ceramic composite will be improved. In this regard, the use of coarser silicon carbide whiskers in the ceramic powder blend results in a lower population of silicon carbide whiskers per unit volume in the starting powder blend as compared to a starting powder blend that uses finer silicon carbide whiskers. This lower whisker population should allow for the use of vacuum sintering followed by hot isostatic pressing (without encapsulation), as opposed to hot pressing, to densify the ceramic composite to a useful density (i.e., greater than 98 percent of the theoretical density). What this means is that by the use of coarser silicon carbide whiskers in the powder blend, one should be able to vacuum sinter and HIP a powder blend that has a higher content of silicon carbide whiskers (i.e., greater than about 10 volume percent silicon carbide whiskers, and more preferably, equal to or greater than about 15 volume percent silicon carbide whiskers) to a useful density than if finer silicon carbide whiskers were used in the blend). See Tiegs, U.S. Pat. No. 4,652,413. This greatly decreases the fabrication costs of the ceramic composite. In addition, it would be expected that a lower whisker population would result in a reduction of the hot pressing temperature to achieve a useful density.

The use of coarser silicon carbide whiskers in the starting powder blend should provide for better flow of the starting powder blend as compared to a blend that uses the finer silicon carbide whiskers. Better powder flow should result in better and easier processing of the powder blend. The use of the coarser silicon carbide whiskers also should result in a reduction of the potential for a non-homogeneous distribution of the silicon carbide whiskers in the ceramic composite.

The use of coarser silicon carbide whiskers also should result in lower production costs as compared to a ceramic composite that uses finer silicon carbide whiskers. This is true because coarser silicon carbide whiskers are typically less expensive to purchase than finer silicon carbide whiskers.

Overall, by the use of coarser silicon carbide whiskers as compared to finer silicon carbide whiskers applicants should be able to produce a ceramic composite that has better properties (e.g., fracture toughness). Applicants should be able to make the process to produce the composite easier and less costly through improved powder flow and by the ability to use vacuum sintering and HIP techniques to densify the composite. Applicants should be able to reduce the starting material costs through the use of coarser silicon carbide whiskers.

All patents, patent applications, articles and other documents identified herein are hereby incorporated by reference herein. Other embodiments of the invention may be apparent to those skilled in the art from a consideration of the specification or the practice of the invention disclosed herein. It is intended that the specification and any examples set forth herein be considered as illustrative only, with the true spirit and scope of the invention being indicated by the following claims.

What is claimed is:

1. A ceramic cutting tool comprising:
    a ceramic composite having a rake face and a flank face, the rake face and the flank face intersect to form a cutting edge;
    the ceramic composite is made by compacting a starting powder blend comprising:
    between about 50 volume percent and about 99 volume percent of a ceramic matrix; and
    between about 1 volume percent and about 50 volume percent as-processed silicon carbide whiskers wherein the as-processed silicon carbide whiskers comprise silicon carbide whiskers subjected to a heat treatment and a mechanical treatment; and
    the ceramic composite having a fracture toughness ($K_{IC}$) of greater than about 4.0 MPam$^{1/2}$, and
    the ceramic composite having a silicon carbide whisker density as measured in whiskers per square millimeter equal to or less than about 1500 times the volume percent of silicon carbide whiskers, but in a density sufficient for the ceramic composite to have said fracture toughness.

2. The ceramic cutting tool according to claim 1 wherein the fracture toughness equals between about 4.0 MPam$^{1/2}$ and about 8.0 MPam$^{1/2}$.

3. The ceramic cutting tool according to claim 1 wherein the fracture toughness equals between about 6.0 MPam$^{1/2}$ and about 7.5 MPam$^{1/2}$.

4. The ceramic cutting tool according to claim 1 wherein the silicon carbide whisker density as measured in whiskers per square millimeter is equal to or less than about 1200 times the volume percent of silicon carbide whiskers.

5. The ceramic cutting tool according to claim 1 wherein the ceramic composite has a hardness equal to between about 92 Rockwell A and about 96 Rockwell A.

6. The ceramic cutting tool according to claim 1 wherein the ceramic composite has a hardness equal to between about 93 Rockwell A and about 95 Rockwell A.

7. The ceramic cutting tool according to claim 1 wherein the ceramic composite has a hardness equal to between about 94 Rockwell A and about 95 Rockwell A.

8. The ceramic cutting tool according to claim 1 wherein the ceramic matrix comprises one or more of the following: alumina, and carbides, nitrides, and/or carbonitrides of one or more of titanium, hafnium, molybdenum, zirconium, tantalum, niobium, vanadium and/or tungsten.

9. The ceramic cutting tool according to claim 1 wherein the matrix further comprises a hard material selected from the group comprising: one or more of the carbides, carbonitrides and nitrides of titanium, hafnium, molybdenum, zirconium, tantalum, niobium, vanadium, and tungsten, and the hard material comprising between about 0.1 volume percent and about 49 volume percent of the matrix.

10. The ceramic cutting tool according to claim 9 wherein the hard material comprises between about 0.25 volume percent and about 25 volume percent of the matrix.

11. The ceramic cutting tool according to claim 1 wherein the ceramic matrix comprises between about 65 volume percent and about 85 volume percent of the ceramic composite.

12. The ceramic cutting tool according to claim 11 wherein the ceramic matrix comprises between about 75 volume percent and about 90 volume percent of the ceramic composite.

13. The ceramic cutting tool according to claim 1 wherein the silicon carbide whiskers have an average diameter equal to or greater than about 1.2 micrometers.

14. The ceramic cutting tool according to claim 1 wherein the silicon carbide whiskers have an average length equal to between about 8 micrometers and about 60 micrometers.

15. The ceramic cutting tool according to claim 1 wherein the silicon carbide whiskers have an average length equal to between about 8 micrometers and about 15 micrometers.

16. The ceramic cutting tool according to claim 1 wherein the silicon carbide whiskers have an average aspect ratio between about 3 and about 50.

17. The ceramic cutting tool according to claim 1 wherein the silicon carbide whiskers have an average aspect ratio between about 6 and about 10.

18. The ceramic cutting tool according to claim 1 wherein the ceramic matrix comprises alumina and titanium carbonitride and the residue of one or more of the following sintering aids: magnesia, yttria, zirconia, aluminum nitride, and silicon nitride.

19. The ceramic cutting tool according to claim 18 wherein the alumina comprises between about 25 volume percent and about 40 volume percent of the matrix, and the titanium carbonitride comprises between about 60 volume percent and about 75 volume percent of the matrix.

20. The ceramic cutting tool according to claim 18 wherein the titanium carbonitride has the formula TiC$_x$N$_y$, wherein x equals about 0.5 and y equals about 0.5.

21. The ceramic cutting tool according to claim 18 wherein the titanium carbonitride comprises between about 1 volume percent and about 99 volume percent of the ceramic composite, the alumina comprises between about 1 volume percent and about 99 volume percent of the ceramic composite, and the silicon carbide whiskers comprises between about 1 volume percent and about 50 volume percent of the ceramic composite.

22. The ceramic cutting tool according to claim 18 wherein the content of the titanium carbonitride is greater than the content of the alumina.

23. The ceramic cutting tool according to claim 18 wherein the titanium carbonitride comprises about 41 volume percent of the ceramic composite, the alumina comprises about 39 volume percent of the ceramic composite, and the silicon carbide whiskers comprises about 20 volume percent the ceramic composite, and the ceramic composite further including the residue from one or more sintering aids.

24. The ceramic cutting tool according to claim 23 wherein the sintering aid comprises the residue from about 0.25 volume percent yttria in the starting powder blend.

25. The ceramic cutting tool according to claim 18 wherein the titanium carbonitride comprises about 38 volume percent of the ceramic composite, the alumina comprises about 37 volume percent of the ceramic composite, and the silicon carbide whiskers comprises about 25 volume percent the ceramic composite, and the ceramic composite further including the residue from one or more sintering aids.

26. The ceramic cutting tool according to claim 25 wherein the sintering aid comprises the residue from about 0.25 volume percent yttria in the starting powder blend.

27. The ceramic cutting tool according to claim 1 wherein the silicon carbide whisker density as measured in whiskers per square millimeter is equal to or less than about 1300 times the volume percent of silicon carbide whiskers.

28. The ceramic cutting tool according to claim 1 wherein the silicon carbide whisker density as measured in whiskers per square millimeter is equal to or less than about 1200 times the volume percent of silicon carbide whiskers.

29. The ceramic cutting tool according to claim 18 wherein the matrix further comprises a hard material selected from the group comprising one or more of the carbides, carbonitrides and nitrides of hafnium, molybdenum, zirconiun, tantalum, niobium, vanadium, and tungsten.

30. The ceramic cutting tool according to claim 1 wherein the ceramic matrix comprises alumina and the residue of one or more of the following sintering aids: magnesia, yttria, zirconia, aluminum nitride, and silicon nitride.

31. The ceramic cutting tool according to claim 30 wherein the ceramic matrix comprises about 100 volume percent alumina, and the as-processed silicon carbide whiskers comprise between about 15 volume percent and about 35 volume percent of the ceramic composite.

32. The ceramic cutting tool according to claim 30 wherein the ceramic matrix comprises about 100 volume percent alumina, and the as-processed silicon carbide whiskers comprise between about 20 volume percent and about 30 volume percent of the ceramic composite.

33. The ceramic cutting tool according to claim 1 wherein the heat treatment occurs at a temperature between about 1400° C. and about 1900° C.

34. The ceramic cutting tool according to claim 1 wherein the mechanical treatment comprises ball milling that occurs for between about 10 minutes and about 60 minutes.

35. A ceramic composite comprising:
a substrate wherein the substrate comprises a ceramic matrix and coarse silicon carbide whiskers:
the ceramic matrix comprising between about 50 volume percent and about 99 volume percent of the substrate, and the coarse silicon carbide whiskers comprising between about 1 volume percent and about 50 volume percent of the substrate;
the ceramic substrate having a fracture toughness ($K_{IC}$) between about 4.0 MPam$^{1/2}$ and about 8.0 MPam$^{1/2}$; and
the substrate having a silicon carbide whisker density as measured in silicon carbide whiskers per square millimeter equal to or less than about 1500 times the volume percent of silicon carbide whiskers, but in a density sufficient for the ceramic substrate to have the fracture toughness.

36. The ceramic composite according to claim 35 wherein the silicon carbide whisker density as measured in whiskers per square millimeter is equal to or less than about 1400 times the volume percent of silicon carbide whiskers.

37. The ceramic composite according to claim 35 wherein the silicon carbide whisker density as measured in whicskers per square millimeter is equal to or less than about 1200 times the volume percent of silicon carbide whiskers.

38. The ceramic cutting tool according to claim 35 wherein the coarse silicon carbide whiskers are as-processed silicon carbide whiskers that have been subjected to a heat treatment and a subsequent mechanical treatment.

39. The ceramic cutting tool according to claim 35 wherein the coarse silicon carbide whiskers have an average whisker aspect ratio equal to between about 6 and about 8.

40. A ceramic cutting tool comprising:
a ceramic composite having a rake face and a flank face, the rake face and the flank face intersect to form a cutting edge;
the ceramic composite is made by compacting a starting powder blend comprising:
between about 50 volume percent and about 99 volume percent of a ceramic matrix, and between about 1 volume percent and about 50 volume percent coarse silicon carbide whiskers,
the ceramic composite having a fracture toughness ($K_{IC}$) of greater than about 4.0 MPam$^{1/2}$, and
the ceramic composite having a silicon carbide whisker density corresponding to the content of the silicon carbide whiskets equal to or less than the value as represented by the line A–B of FIG. 8, but in a density sufficient for the ceramic composite to have the fracture toughness.

41. The ceramic cutting tool according to claim 40 wherein the coarse silicon carbide whiskers are as-processed silicon carbide whiskers that have been subjected to a heat treatment and a subsequent mechanical treatment.

42. The ceramic cutting tool according to claim 41 wherein the heat treatment occurs at a temperature between about 1400° C. and about 1900° C.

43. The ceramic cutting tool according to claim 41 wherein the mechanical treatment comprises ball milling that occurs for between about 10 minutes and about 60 minutes.

44. The ceramic cutting tool according to claim 40 wherein the coarse silicon carbide whiskers have an average whisker aspect ratio equal to between about 6 and about 8.

* * * * *